United States Patent [19]

Morrison

[11] 4,068,821
[45] Jan. 17, 1978

[54] VALVE SEAT RING HAVING A CORNER GROOVE TO RECEIVE AN ELASTIC SEAL RING

[75] Inventor: Bertram L. Morrison, Houston, Tex.

[73] Assignee: ACF Industries, Incorporated, New York, N.Y.

[21] Appl. No.: 722,893

[22] Filed: Sept. 13, 1976

[51] Int. Cl.² ............................................. F16K 3/20
[52] U.S. Cl. ..................................... 251/172; 251/328
[58] Field of Search ................. 251/328, 315, 316, 172

[56] References Cited

U.S. PATENT DOCUMENTS

| | | | |
|---|---|---|---|
| 2,985,189 | 5/1961 | Dickinson | 251/328 X |
| 3,215,157 | 11/1965 | Anderson et al. | 251/328 X |
| 3,301,523 | 1/1967 | Lowrey | 251/328 X |
| 3,307,826 | 3/1967 | Lowrey | 251/328 X |

*Primary Examiner*—Arnold Rosenthal
*Attorney, Agent, or Firm*—Eugene N. Riddle

[57] ABSTRACT

A pair of seat ring members are loosely mounted in annular recesses around the longitudinal bore in a gate valve body at the intersection of the bore and the valve chamber on opposite sides of the gate member. Each of the seat ring members has a rear face comprised of a pair of stepped portions connected by an outwardly facing annular surface portion. Each seat ring has a groove at the juncture of the outer stepped surface portion and the outwardly facing annular surface. A seal ring chamber is formed between the recess annular wall, the stepped outer surface portion, the outwardly facing annular surface and the groove. A resilient O-ring is positioned in the seal ring chamber. The O-ring has a sufficient cross section to seal between the recessed end wall and the outwardly facing annular surface when initially positioned in the seal ring chamber upon assembly of the valve. When an unbalanced pressure condition is present across the downstream O-ring then that O-ring is displaced radially inward and partially enclosed in the groove in order to prevent excessive compression thereof, while at the same time the upstream O-ring maintains a seal between the upstream recess end wall and the upstream outwardly facing annular surface.

6 Claims, 4 Drawing Figures

VALVE SEAT RING HAVING A CORNER GROOVE TO RECEIVE AN ELASTIC SEAL RING

BACKGROUND OF THE INVENTION

This invention is related to floating seat ring seals for valves. More specifically this invention is related to a seat ring construction for enclosing and mounting an O-ring between the seat ring and the seat ring recess in a gate valve.

It is quite well known in the art to provide floating seats in gate valves with an O-ring in the seat ring recess behind the seat ring to seal between the seat ring and the valve body. All of the prior art constructions require extremely fine tolerances and precise dimensioning in this area of the structure in order to establish a seal with a minimum of compression while at the same time sizing the seat assembly to prevent damage to the O-ring from over compression. In order for O-rings to be useful, effective sealing devises they must be resilient and be able to return to substantially their original shape. Once an O-ring is compressed so that stresses are raised above the elastic limit of the material, the O-ring will not return to its original cross-sectional shape, hence it will not function as a sealing device as originally intended it becomes marginal. Typically for any O-ring constructed of elastomeric material if it is squeezed or compressed such that its cross-sectional diameter is reduced more than approximately thirty (30) percent of the free cross-sectional diameter, then the O-ring will retain a permanent set and will not return to its original cross-sectional shape. This limitation on compression of the O-rings dictates very critical dimensions in gate valve seat ring construction so the O-rings can function both as seals and as springs and still return to substantially their original round cross-sectional shape. Because the dimensions are critical in this type of seat ring construction the tolerances for these dimensions are quite small. The machining and manufacture of these seat constructions are very expensive because of the precise, consistent accuracy required on the part of the machinist and the manufacturing size control of the O-ring. As a whole, this prior art seat ring construction is widely used in the valve industry, however, such is extremely expensive because of the precise machining which is required and the precise O-ring sizing which must be maintained in order for the seal design to function properly. The prior art seat construction briefly described here is shown in FIG. 2. of the drawings and such is described in detail in the following.

SUMMARY OF THE INVENTION

In an embodiment the gate valve seal construction of this invention includes a pair of seat rings loosely mounted in annular recesses in a gate valve body on opposite sides of the gate member and with a seal ring chamber formed at an outer peripheral portion of the juncture of the seat rings and the recesses. A resilient O-ring is positioned in the seal ring chamber. A groove is located around the seat ring at a stepped portion thereof and opening to the seal ring chamber. The resilient O-ring is to a small extent received in the groove on the seat ring when the valve is in an assembled non-loaded condition. The O-ring can be displaced to a position wherein a substantial portion thereof is in the groove when the O-ring is subjected to an unbalanced fluid pressure force moving it toward the groove.

One object of this invention is to provide a gate valve seat seal construction which overcomes the aforementioned disadvantages of the prior art devices and seat seal constructions.

One other object of this invention is to provide a gate valve seat seal construction which does not require highly critical tolerances for the seat rings and the machined seat pocket area of the valve.

Still another object of this invention is to provide a gate valve seat ring seal construction which uses an O-ring to function as a spring in displacing the floating seat rings, as a seal between the seat rings and the valve body. Yet one further object of this invention is to provide a seat ring seal construction using an O-ring wherein the O-ring will not be compressed at any time in any operating condition more than an amount that would result in permanent deformation of the O-ring. Various other objects, advantages, and features of this invention will become apparent to those skilled in the art from the following discussion, taken in conjunction with the accompanying drawings, in which:

The following is a discussion and a description of preferred specific embodiments of the gate valve seat ring seal construction of this invention, such being made with reference to the drawings whereupon the same reference numbers are used to indicate the same or similar parts and/or structure. It is to be understood that such discussion and a description is not to unduly limit the scope of the invention.

DETAILED DESCRIPTION

Figure 2:
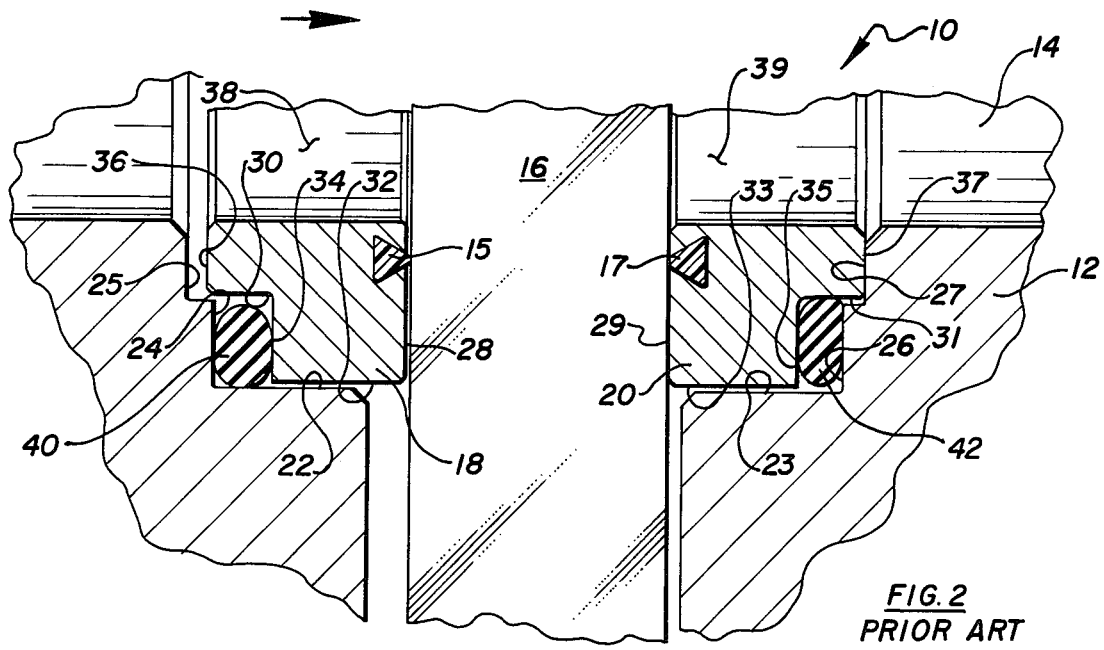
FIG. 2 is a cross-sectional view of a portion of a gate valve employing a well known and prior art valve seat ring and body construction wherein portions of the gate valve body on opposite sides of the gate are shown with the gate and the seat ring members in a downstream displaced condition with the downstream seat member in a maximum displaced position in the seat ring recess and the downstream O-ring being compressed to maximum.

Before proceeding with the detailed description of this invention, it is first in order to provide a detailed description of the prior art structure so that the importance and significance of the invention disclosed herein can be fully understood and appreciated. Description of the Prior Art FIG. 2 shows a portion of a gate valve structure employing a conventional and typical prior art structure. The prior structure is indicated generally at 10 and includes a gate valve body 12 having a bore 14 therethrough and a valve chamber intersecting bore 14. A gate member 16 is movably mounted in the valve chamber for movement between open and closed positions. Upstream and downstream seat members 18 and 20 are mounted in seat ring recesses located around bore 14 at the valve chamber as shown. Both of the seat recesses and seat members in this prior art valve are identical. The seat recesses include outer annular walls 22 and 23 coaxial with bore 14. The end walls of the seat recesses are defined by respective parallel stepped surface portions 24, 25, 26, and 27. The radially smaller recessed stepped surface portions 25 and 27 join bore 14. Seat members 18 and 20 have respective seat face surface portion 28 and 29 which are adjacent to opposed sides of gate 16. Seat members 18 and 20 have resilient face seals 15 and 17 respectively which seal against gate 16. The opposing outer ends of seat members 18 and 20 have outwardly extending stepped portions, comprised of respective inner stepped surface portions 30 and 31 and respective outer stepped surface portions 32 and 33 which are joined by outwardly facing annular surfaces 34 and 35. The inner stepped surfaces 30 and 31 are connected by outer seat ring end surfaces 36 and 37 to the inner annulus portions of seat rings 38 and 39. The seat ring annulus portions 38 and 39 are aligned with bore 14. Outer stepped surfaces 32 and 33 are spaced relative to the recess annular walls 22 and 23 such that the seat members 18 and 20 can float or move in axial alignment with the bore. Construction of the recesses and the seat rings is such that seal ring chambers are formed around the periphery of the seat members at the outer portion of each recess. The seal ring chambers retain resilient O-rings 40 and 42 around the upstream and downstream seat members 18 and 39 respectively. Upon initial assembly of the valve O-rings 40 and 42 are fitted around the seat members resting on the inner stepped surfaces thereof thereof when the seats are placed individually into the associated recesses. When gate 16 is inserted between seat members 18 and 39, the O-rings 40 and 42 act as springs because they are slightly compressed between the outwardly facing seat annular surfaces 34 and 35 and recess end walls 24 and 26. Initial compression of O-rings 40 and 42 is necessary for providing an initial seal around the seat members so once the valve is closed then fluid pressure will displace the upstream O-ring outward within the seal ring chamber.

In this prior art structure when gate 16 is in the closed position as shown in FIG. 2 with fluid pressure on the upstream side thereof, (on the left-hand side of FIG. 2) then gate 16 along with upstream seat member 18 and downstream seat member 39 are displaced in a downstream direction. The ultimate position of downstream seat member 39 is with outwardly facing annular seat member surface 18 resting in flush contact with recess end wall portion 27. It is to be noted that in the ultimate downstream position of seat member 20 a maximum squeeze is exerted on O-ring 42. It is important to note that in the event O-ring 42 is squeezed or compressed more than between approximately 30 to 35 percent of the free-cross-sectional diameter thereof, it will be subjected to stresses above its elastic limit and therefore will take a permanent set and will be permanently deformed and will not return to its original round cross-sectional size and shape. Once O-ring 42 has acquired a permanent set it will not have the initial resiliency or capability to apply sufficient force to provide an initial seal or the proper spring force between surfaces 26 and 35. In other words because the O-ring has acquired a permanent set it is ruined and will no longer act as a spring or effect a fluid tight seal. It is to be understood that O-ring 42 is not ruined every time the seat 20 is moved to the fully downstream position unless the seat and seat pocket dimensions are such that the O-ring is squeezed more than the critical amount when it is in the fully downstream position. Very precise sizing of the seat members, the O-ring, and the recesses are required to prevent O-ring 42 from being ruined while O-ring 40 creates an upstream seal between surfaces 24 and 34. Manufacturing tolerances must be extremely small in order to make this seat seal structure consistently operable. The necessity of small manufacturing tolerances presents an enormous problem particularly in large valves and therefore considerable time is required to machine the recess and the seat rings so they will operate in a specific valve without ruining the O-rings. The major disadvantage of this seat construction is from the manufacturing aspect because after expending a great amount of time and effort in machining the valve body of the seat ring members then they still may not operate properly if the collective summation of the parts tolerances are considered with regard to downstream motion of the gate and the seat rings. In other words the cumulative tolerance of the parts in a completed valve may be such that the downstream O-ring can be compressed sufficiently to give the O-ring a permanent set while the upstream O-ring may not be compressed enough to seal. Description of the Invention Referring to FIG. 1 such shows a portion of a gate valve employing the novel seat ring seal construction of this invention will now be described in detail and sufficiently so that it can be clearly compared with the prior art described above. The portion of the gate valve shown in FIG. 1 includes a gate valve body as represented by portions thereof 50 and 52 which have a bore 54 therethrough joining a valve chamber there between and enclosing the gate 56. Gate 56 is movably mounted in the valve chamber for motion between the open and closed positions. A valve stem 58 is secured to gate 56 and extends through the valve bonnet (not shown) for connection with a valve operator. A pair of seat members 58 and 60 are mounted in respective annular recesses in the valve body indicated generally at 59 and 61. The recesses and seat members 58 and 60 are identical for both the upstream and downstream sides of the valve.

Recess 59 is constructed with an annular wall 62 co-axial with valve bore 54 and extending outward in valve body portion 50 from the valve chamber. Annular wall 62 joins a radially disposed inner stepped recess surface portion 66 and a radially disposed outer stepped recess surface portion 70 at the outer end of recess 59. Recess 61 on the opposite side of the valve chamber is constructed in the same shape as recess 59 with an annular wall 64 joining an inner stepped recess surface portion 68 and an outer stepped recess surface portion 72 at the outermost end of the recess.

Figure 1:
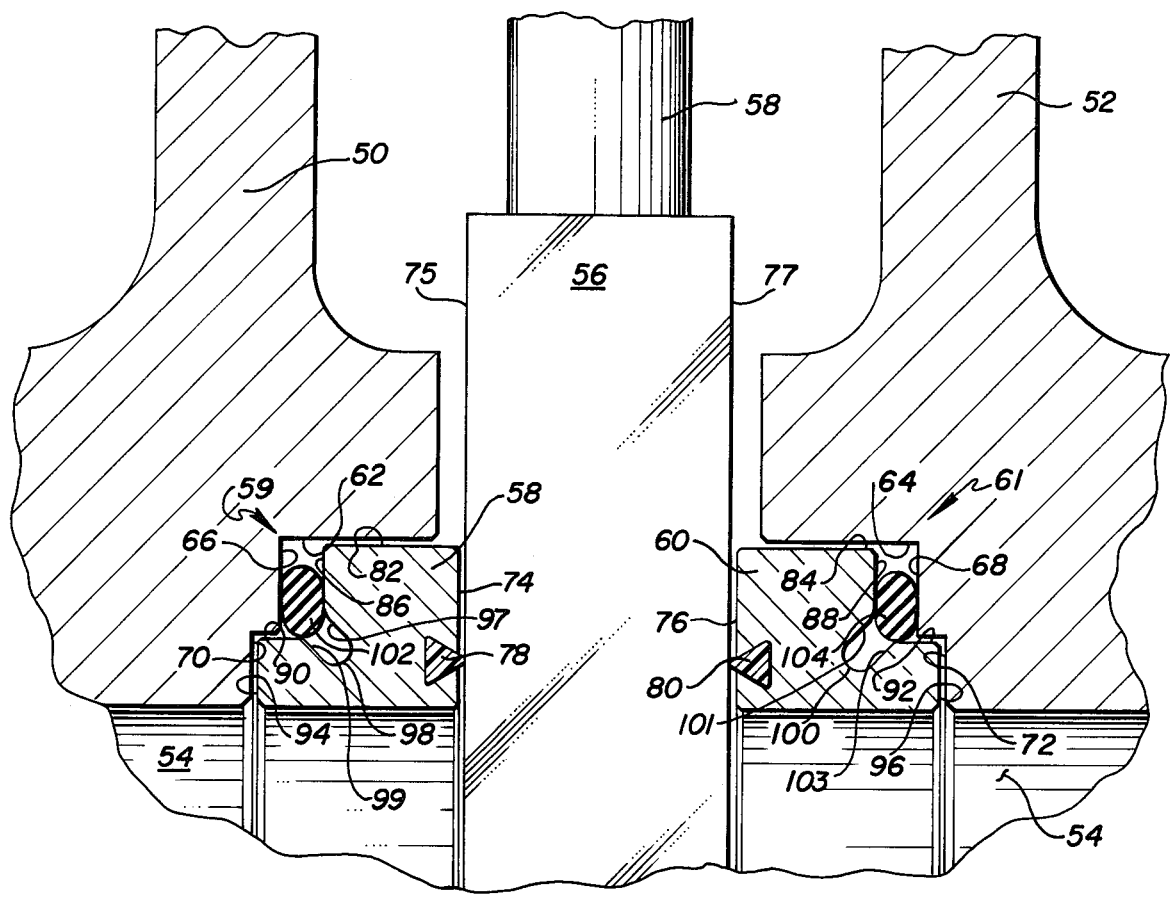
FIG. 1 is a cross-sectional view of a portion of a gate valve showing a portion of a gate, a stem, and the valve body on opposite sides of the gate and the seat ring members wherein the gate valve is shown with the gate closed and without line pressure on the valve.

Seat member 58 is constructed with an inner face 74 adjacent gate side surface 75 and a face seal ring 78 mounted in the seat ring and extending from face 74. The extended end of face seal ring 78 is normally resting in sealing contact with gate side surface 75. Face seal ring 78 can be deformed so gate surface 75 contacts seat inner face 74 for high pressure sealing. Seat member 58 is shaped to extend outwardly into recess 59. Seat ring 58 has an outer peripheral surface 82 and an inner peripheral surface 90 joined by a radially disposed annular surface 86. Peripheral surfaces 82 and 90 form outer and inner stepped portions respectively about the outer circumference of seat ring 58. Inner peripheral surface 90 joins radially disposed seat end surface 94 at the outer end of seat member 58. An annular bore through seat member 58 connects surfaces 74 and 94. A groove or channel, indicated at 98, is formed around seat member 58 at the juncture of surfaces 86 and 90. Groove 98 is shown as having substantially parallel sides 97 and 99 and a rounded bottom or end portion with sides 97 and 99 smoothly blending into surfaces 86 and 90 respectively. Groove 98 can if desired be shaped differently than shown, for example, it can be essentially rectangular, trapezoidal, or V-shaped. Groove 98 when shaped generally as shown in the drawings must necessarily be narrower than the width of O-ring 102 at the juncture with sides 86 and 90 in order to prevent O-ring 102 from being completely displaced into the groove. Groove or channel 98 can if desired be formed as an enlarged space at the juncture of the recess radially disposed annular surface 86 and the recess inner peripheral surface 90 wherein sides of the groove or channel are defined by at least one surface that is outward of the planes of surfaces 86 and 90. An O-ring seal chamber is formed between recess 59 and seat member 58 and defined by surfaces 66 and 86, portions of surfaces 62 and 90, and the open end of groove 98. An O-ring 102 is contained in the seal ring chamber. For unloaded conditions of the valve O-ring 102 is located as shown in FIG. 1.

Seat member 60 is constructed similar to seat member 58 and fitted into recess 61 as shown. Seat member 60 has an inner face 76 adjacent gate side surface 77 and a face seal 80 mounted in seat member 60 extending from face 76 thereof. An outer peripheral surface 84 of seat member 60 is joined by radially disposed annular surface 88 to an inner peripheral surface 92. Peripheral surfaces 84 and 92 form outer and inner stepped portions respectively about the outer circumference of seat member 60. Inner peripheral surface 92 joins radially disposed seat end surface 96 at the outer end of seat member 60. A cylindrical bore through seat member 60 joins surfaces 76 and 96. A groove, indicated at 100, is formed around seat member 60 at the juncture of surfaces 88 and 92. Groove 100 has sides 101 and 103 joined by the closed bottom end of the groove and smoothly blending into surfaces 88 and 92 respectively. The shape of groove 100 can be varied the same as groove 98. It is to be understood that grooves 98 and 100 do not necessarily have to be shaped the same if desired. An O-ring seal chamber is defined between surfaces 88 and 68, portions of surfaces 64 and 92, and the open end of groove 100 with an O-ring 104 contained therein.

Each seat ring is provided with a groove 98 and 100, respectively, therearound at the juncture of outwardly facing annular surfaces 86 and 88 and inner stepped surfaces 90 and 92. Grooves 98 and 100 are shown as having a substantially U-shaped cross-section as shown clearly in FIGS. 1 and 3. It is to be understood that the grooves can be shaped other than as shown and still function similarly. For example, they can be U-shaped or rectangular on three sides thereof. Grooves 98 and 100 are also positioned in a substantially equidistant angular relation to inner stepped surfaces 90 and 92 and outwardly facing annular surfaces 86 and 88, respectively for each seat member. O-ring seal chambers are formed around and between the perimeter of the outer end portion of each seat ring member and the outer associated inner annular portion of the recesses to receive an O-ring. The O-ring seal chambers retain O-rings 102 and 104 around the outer portion of seat members 58 and 60, respectively, in the associated recesses as the seat members move upstream and downstream in normal use.

Figure 3:
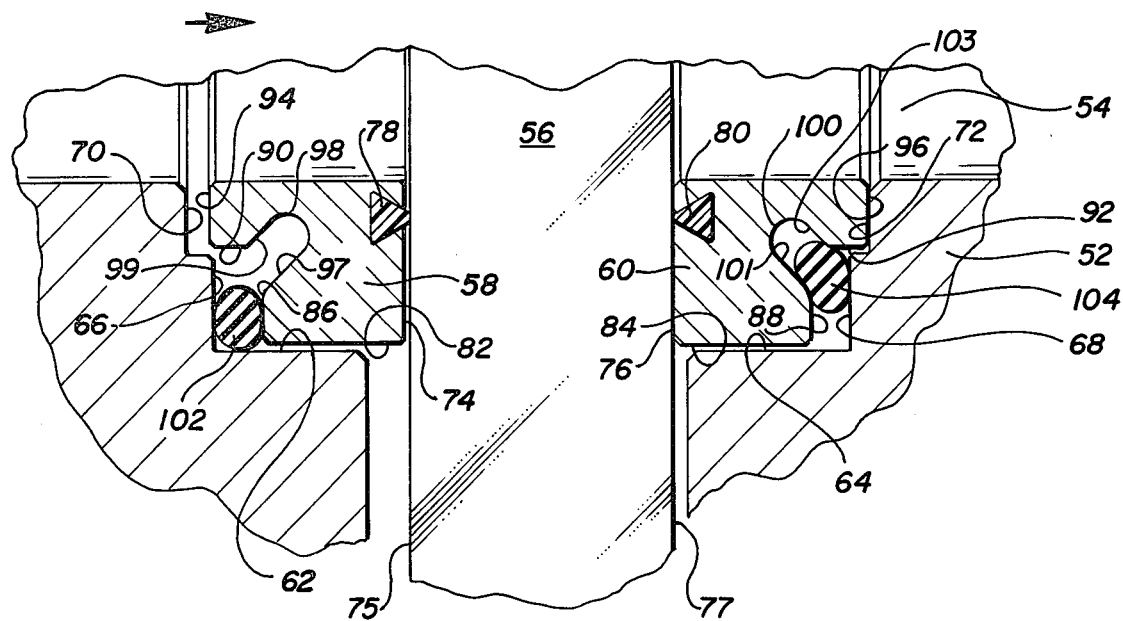
FIG. 3 is a cross-sectional view of a portion of a gate valve employing the novel seat and seal construction of this invention showing both upstream and downstream seat ring members, a portion of the gate, and portions of the adjacent valve body wherein the gate member and downstream seat are shown displaced to a maximum downstream position.

In regard to dimensions of the seat members, the recesses and O-rings it is to be noted must be sized so that O-rings 102 and 104 are initially squeezed upon assembly of the valve so they function as springs acting on the seat members and to provide an initial seal between opposed sides of the O-ring seal chamber. Typically the amount of O-ring squeeze initially required to create an initial seal is between 5 and 10 percent reduction of the cross-sectional diameter of each O-ring. It is to be understood the minimum squeeze is critical as a minimum in order to obtain the initial seal. Initial sealing between the valve body and the seat rings is necessary to provide a low pressure sealing valve and so the O-rings will function properly at normal pressures. The width of each groove in the seat ring approximates the radius of the associated O-ring. Preferably the width or spacing of the groove sides at the open portion thereof is substantially less than or equal to the free diameter of the associated O-ring and greater than the free O-ring radius. The depth of the individual grooves can be at least equal to or greater than the free diameter of the individual O-rings. The diameter of each O-ring is chosen so it can be slipped over the inner stepped surface of the associated seat ring and will be retained on this surface of the seat ring for installation of the seat member in the valve. For convenience, the O-rings are chosen in this size so a valve can be easily assembled without problems which would be encountered if the O-ring was not held in place. In practice to retain the O-ring on the inner stepped portion it is only necessary that the O-ring inside diameter be equal to or slightly smaller than the diameter of the inner stepped surface of the seat member so the O-ring will retain itself on the seat member yet not be so tight as to provide resistance to moving radially outward when line pressure displaces the O-ring outward on the upstream side of the valve. The total squeeze on the downstream O-ring is the initial squeeze on the O-ring which is required to establish an initial seal plus the squeeze resulting from movement of the O-ring chamber end walls toward each other. The width of the seal ring chamber when downstream seat member 60 is in the position shown in FIG. 3 is governed by the distance between surfaces 96 and 88 and the distance between surfaces 72 and 68 because surfaces 96 and 72 are in flush contact. For the novel seat ring seal construction of this invention the amount of total squeeze on an O-ring is governed partially by the initial squeeze, partially by the change in width of the seal ring chamber and partially by the size of the groove. For purposes of the discussion here squeeze on the O-ring is defined as the reduction in the cross-sectional diameter of an O-ring or in other words the distance which sides of the O-ring chamber move together from a dimension equal to the free cross-sectional O-ring diameter.

FIG. 1 shows the gate valve in an assembled and closed and non-pressure loaded position which locates the seats in the position they assume when the valve is open and fluid is flowing through the valve bore. FIG.

3 shows the valve in a closed position with fluid pressure on the upstream side as indicated by the arrow. In this pressure loaded condition seat surface 96 contacts recess surface 72 and the downstream side of gate 56 contacts seat facing surface 76. In this condition the fluid pressure on the upstream side of gate 56 is substantially greater than on the downstream side of gate 56 and this upstream pressure can also be substantially greater than the pressure on the downstream side of gate 56. This unbalance of pressure across gate 56 will cause O-ring 102 to be displaced to the position shown in FIG. 3 whereupon it is circumferentially expanded into the outer peripheral portion of the seal ring chamber. In this condition fluid pressure on the inner annulus portion of O-ring 102 urges it into sealing contact with recess annular wall 62, end wall 66, and seat ring outwardly facing annular surface 86. On the downstream side of gate 56 because the body pressure is higher than the downstream pressure in bore 54 O-ring 104 is displaced radially inward toward and into groove 100. O-ring 104 is in effect squeezed into groove 100 partially by the compressive forces acting on the O-ring 104 between seat surface 88 and recess end wall 68 after it is displaced radially inward. In this condition the O-ring 104 seals against seat member 60 in two places, first at the juncture of surface 88 and one side of groove 100 and on the opposite side of the groove at the juncture of seat surface 92. O-ring 104 additionally contacts and seals against the recess at the recess end wall 68. It is to be noted that the gate, seat members, and seat ring recesses are sized so that when the valve is in the position shown in FIG. 3 then upstream O-ring 102 is still squeezed sufficiently to maintain sealing between surfaces 66 and 86 and to create a spring force to urge the upstream seat ring to contact the gate for an upstream seal. Sealing between surfaces 86 and 66 is accomplished by the fluid pressure exerted on the inner annular portion of O-ring 102 urging it radially outward into contact with surfaces 66, 62, and 86. However, it is to be noted that sealing between surfaces 86 and 68 is necessary so the O-ring can be radially expanded from the position shown in FIG. 1 to the position shown in FIG. 3 when the seat member 58 moves downstream. In regard to downstream O-ring 104, when the valve is positioned as shown in FIG. 3 this O-ring is subjected to a maximum squeeze and such is governed by the distances between surfaces 88 and 96, and between surfaces 72 and 68. When gate 56 is raised from the closed position shown in FIG. 3 to an open position (not shown) the downstream fluid pressure in bore 54 is increased to substantially the same as the upstream pressure. This change in pressure conditions causes the seat members to move substantially to the position shown in FIG. 1. Also, when the gate valve is returned to the open position then O-rings 102 and 104 again act as springs and as seals to urge seat members 58 and 60 toward gate 56. The spring action of the O-rings 102 and 104 against the seat members urges the face seal of the seat members into sealing contact with the gate and at the same time provides a seal between the body recess and the outer portions of the seat members.

Figure 4:
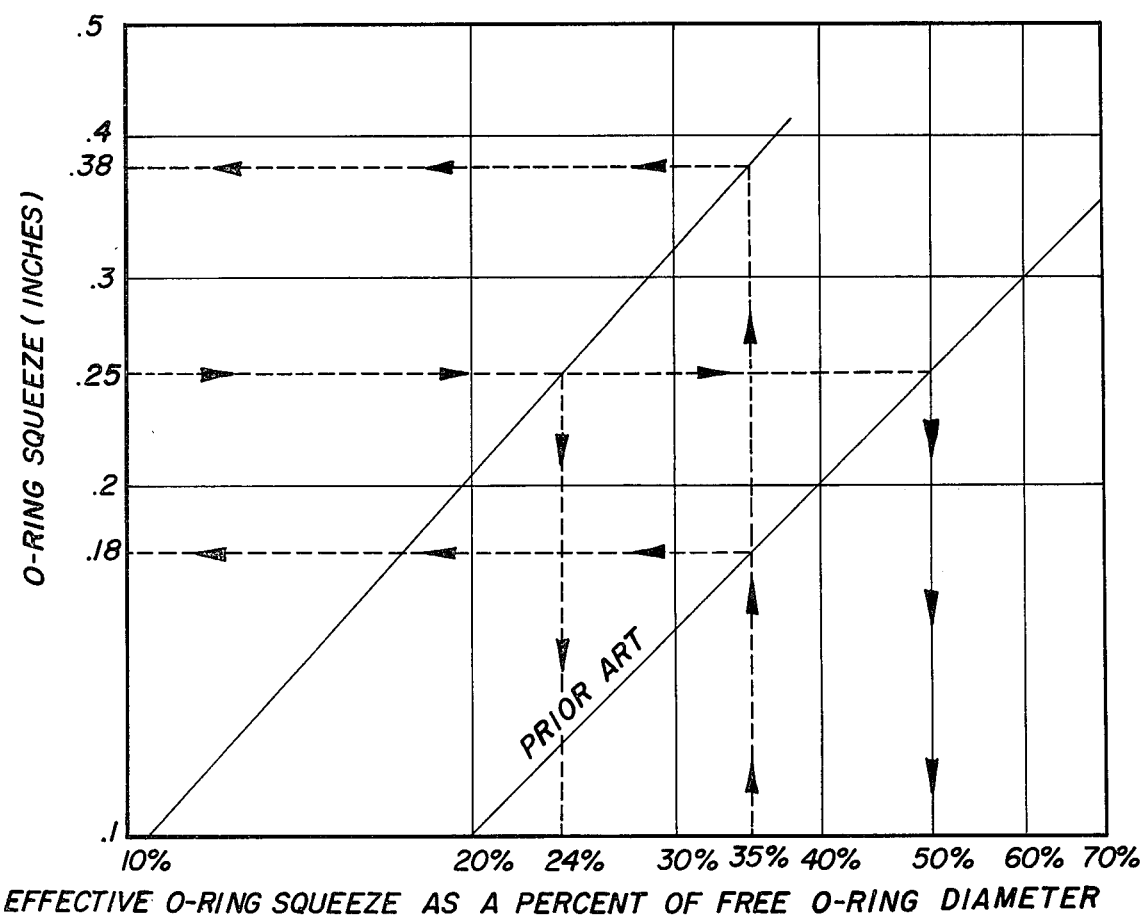
FIG. 4 is a graph of O-ring squeeze in inches versus effective O-ring squeeze as a percentage reduction of O-ring free cross-sectional diameter for a one-half inch cross-sectional diameter O-ring in a prior art seat ring seal construction and in the novel seat ring seal construction of this invention.

For comparison of the prior art seat seal construction with the seat seal construction of this invention reference is now made to FIGS. 2, 3, and 4 collectively. It is to be noted that FIGS. 2 and 3 are drawn to substantially the same size for a clear comparative illustration of the present invention and the prior art. For purposes of illustration it is necessary to assume the dimensions of both the prior art valve construction and the valve construction of this invention are selected to provide a nominal O-ring squeeze within the range of approximately 5 percent to 15 percent of the original diameter when the valves are in the assembled condition. Additionally, dimensions of the valves shown in FIGS. 2 and 3 are selected to provide a minimum squeeze of between approximately 3 percent to 8 percent of the original diameter of the upstream O-ring when the gate is in the closed position and fully displaced in the downstream direction. As described above the critical portion of this valve seat seal structure is the portion affecting the downstream side O-ring in the valve when the gate and the downstream seat member are shifted to the extreme downstream position as shown in FIGS. 2 and 3. When the downstream seat member and the gate are positioned in this extreme downstream location it is desirable to maintain a squeeze on the upstream O-ring of from about 3 percent to about 5 percent so the O-ring will seal between the recess and the seat member sufficiently for fluid pressure to expand the O-ring to the radially outwardly displaced position shown in FIGS. 2 and 3. Sizing of the seat members and the O-rings must be done so that a minimum squeeze is maintained on the upstream O-ring while the downstream O-ring is not compressed to the point which will leave it with a permanent set.

FIG. 4 illustrates graphically the effect of O-ring squeeze in the valve seat constructions shown herein. The curves in FIG. 4 are drawn for a ½ inch nominal diameter O-ring. The ordinate of FIG. 4 specifies total O-ring squeeze in inches as a reduction from the free O-ring diameter in inches for an O-ring compressed between 2 parallel planes. The abscissas of FIG. 4 specifies effective O-ring squeeze as a percent of free O-ring diameter with effective squeeze being the actual area reduction of the O-ring, considering the groove, expressed in terms of an equivalent area reduction between two parallel planes. Two lines are drawn on the graph one illustrating squeeze of the downstream O-ring for the prior art valve seat seal construction and the other line representing the squeeze on the downstream O-ring in the novel seat seal construction with the groove of this invention. FIG. 4 does not show the total range of squeeze on the O-rings from no squeeze up to a maximum, it only shows the squeeze in the area which is a reasonable maximum for such seat seal constructions. Regarding the prior art curve, it is to be noticed that for a squeeze of ¼ inch the effective squeeze on the O-ring is 50 percent of the free O-ring diameter which is more than enough to compress the O-ring to give it a permanent set. In regard to the curve of the novel seat seal construction of this invention, the same squeeze of ¼ inch results in an effective O-ring squeeze of only approximately 24 percent of the free O-ring diameter which is significantly less than the amount required to give the O-ring a permanent set.

In further study of FIG. 4, it is to be noted that for a squeeze or compression of 35 percent of the free O-ring diameter the prior art seat seal construction can only squeeze or compress the O-ring approximately eighteen hundredths (0.18) inches, whereas the novel seat seal construction of this invention will allow an O-ring squeeze of thirty-eight hundreds (0.38) inches. The reason for the dramatic reduction in compression of the downstream O-ring and the novel seat construction of this invention is easily understood upon comparing FIGS. 2 and 3. In FIG. 2 O-ring 42 is compressed to the point where it substantially fills the seal ring chamber and it is restrained at least on three sides to a confined space and cannot flow in any direction beyond the limits of the rectangularly shaped seal ring chamber. Although the novel seat seal ring construction in FIG. 3 compresses O-ring 104 the same distance between opposed sides of the seal ring chamber as the prior art structure shown in FIG. 2, the novel groove 100 provides an additional expansion space for the O-ring to flow into upon compression. This additional expansion or flow space substantially reduces the total amount of diameter reduction or cross-sectional area reduction of the O-ring's squeeze from what it would be if merely squeezed between two parallel planes as in the prior art seat assembly. Obviously by reducing the amount of overall cross-sectional reduction or compression O-ring 104 can be compressed to a greater extent between surfaces 88 and 68 than an O-ring in a conventional seat construction.

In the manufacture of the seat ring seal construction of this invention the unique and novel groove structure of the seat member gives the seat seal construction of this invention a decided advantage over the prior art devices because the seat members and the recesses do not have to be machined to the extremely fine tolerances required in the prior art seat seal constructions. Because the downstream O-ring can be compressed between the annular surfaces of the seat member and the recess (such as surfaces 88 and 68 in FIG. 3), without resulting in an overall O-ring squeeze or compression greater than that required to give the O-ring a permanent set. In manufacturing the novel seat member, formation of the groove requires slightly more machining on the seat member than the prior art seat member, however, the effort of this is greatly compensated for by its benefits. In some prior art seat constructions the tolerances of the recesses and the seat members are such that parts may or may not be interchangeable depending upon the tolerances held in the manufacturing operation. However, in utilizing the seat construction of this invention interchangeability of parts can readily be done because the seat member can be designed so that with relatively large tolerances the downstream O-ring will still be compressed less than that required to give it a permanent set. This is obvious upon examining the graph of FIG. 4 wherein for a maximum squeeze or compression of 35 percent the novel seat ring construction of this invention allows more than twice the amount of squeeze between the opposed seal ring chamber surfaces as does the prior art seat construction.

In the use of the novel seat seal construction of this invention it is seen that same provides a suitable seat seal construction for a gate valve wherein the O-ring seals function both as springs and as seals.

Furthermore, it is seen that the novel seat ring construction of this invention provides a simply constructed seat ring member which does not require extremely fine and precise tolerances as does the prior art counterpart. The novel seat seal construction of this invention is less expensive to manufacture than prior art seat construction because it does not require the fine control on the machining and the O-ring cross-sectional sides as does the prior art structures. The novel seat ring construction is more economical to use in valve manufacture than the prior art constructions because of the reduced manufacturing costs in machining and the reduction in scrapping associated with non-usable finished parts as is the case in the prior art construction.

What is claimed is:
1. A valve comprising:
 a. a housing with a longitudinal bore therethrough,
 b. a valve chamber intersecting said bore,
 c. a valve member mounted within said valve chamber for movement between open and closed portions,
 d. a pair of facing annular recesses surrounding said bore at said valve chamber, each of said recesses having an end wall joining said bore and an annular wall coaxial with said bore joining said end wall and said valve chamber,
 e. a pair of seat ring members loosely mounted within said annular recesses for floating back and forth movement in said recesses, each of said seat ring members having an outer circumference comprising a pair of generally parallel inner and outer stepped peripheral surfaces, a radially disposed outwardly facing annular surface connecting the stepped peripheral surfaces, and a radially disposed seat end surface joining said inner stepped peripheral surface and the internal bore of said seat ring member, said seat ring member having a peripheral groove at the juncture of said inner stepped peripheral surface and said radially disposed outwardly facing annular surface, said groove having a pair of generally parallel opposed sides respectively joining said inner stepped peripheral surface and said radially disposed outwardly facing annular surface at obtuse angles,
 f. a seal ring chamber between each of said seat ring members and the end wall of the associated annular recess, said seal ring chamber defined by said recess annular wall, said inner stepped peripheral surface, said radially disposed outwardly facing annular surface, and said recess end wall, and
 g. a resilient O-ring positioned within the seal ring chamber and having a cross-sectional span sufficient to seal between said recess end wall and said radially disposed outwardly facing annular surface when said O-ring is initially positioned in said seal ring chamber upon assembly of said valve, said groove sides being spaced apart a distance substantially approximately the original cross-sectional radius of said O-ring, the depth of said groove being at least equal to the original cross-sectional diameter of said O-ring to receive a portion of said O-ring between said generally parallel sides when said O-ring is subjected to mechanical compression between said recess end wall and said radially disposed outward facing annular surface so said O-ring is squeezed no more than approximately 35 percent between said end wall and said radially disposed outwardly facing annular surface in order that the elastic limit of said O-ring is not exceeded, said radially disposed seat end surface contacting said recess end wall to limit outward movement of said seat ring member when the groove has received a portion of said O-ring with said O-ring being in fluid-tight sealing contact with said recess end wall, said radially disposed outwardly facing annular surface, and said groove sides.

2. The valve of claim 1, wherein:
 a. said groove is generally cross-sectional U-shaped, and b. said recess end wall has inner and outer stepped portions with said recess outer stepped portion connected to said bore and receiving a portion of said seat ring inner stepped surface and said radially disposed seat end surface, and said recess inner stepped portion contacting said O-ring.

3. The valve of claim 1, wherein, said O-ring has an initial inside diameter substantially the same as the diameter of said inner stepped peripheral surface.

4. The valve of claim 1, wherein, said O-ring is initially compressed upon assembly of said valve, between approximately 5 percent to about 15 percent for initial sealing between said seat members and said recesses.

5. The valve of claim 1, wherein, said O-ring is initially compressed between said recessed end wall and said radially disposed outwardly facing surface upon assembly of said valve at least approximately 3 percent of the original O-ring diameter, and said O-ring has an inside diameter not substantially smaller than the diameter of said inner stepped peripheral surface with an inner portion of said O-ring being within said groove in the compressed position beyond the plane of said seat inner stepped peripheral surface and beyond the plane of said radially disposed outwardly facing annular surface.

6. The valve of claim 15, wherein:
a. said valve is a gate valve, and
b. said O-ring is initially compressed between said recess end wall and said radially disposed outwardly facing annular surface sufficiently to seal between said surfaces at relatively low fluid pressures.

* * * * *